United States Patent [19]

Seemann et al.

[11] 4,153,156
[45] May 8, 1979

[54] METHOD FOR REINFORCING OR SEALING SOLID STRUCTURES OR FOR ANCHORING BOLTS THEREIN AND CARTRIDGES FOR USE IN SUCH METHOD

[75] Inventors: Ronald W. Seemann, Roseville; Thomas I. Bradshaw, Shoreview, both of Minn.

[73] Assignee: Minnesota Mining and Manufacturing Company, Saint Paul, Minn.

[21] Appl. No.: 822,875

[22] Filed: Aug. 8, 1977

[51] Int. Cl.$^2$ .................. B65D 25/08; E21D 21/00
[52] U.S. Cl. .................................. 206/219; 206/813; 428/307; 428/35; 428/406; 405/261
[58] Field of Search ............... 428/307, 406, 35; 61/45 B; 206/219, 221, 813; 264/4; 405/261

[56] References Cited

U.S. PATENT DOCUMENTS

| | | | |
|---|---|---|---|
| 3,108,443 | 10/1963 | Schuermann | 61/45 B |
| 3,324,663 | 6/1967 | McLean | 61/45 B |
| 3,698,196 | 10/1972 | Jankowski | 61/45 B |
| 3,699,687 | 10/1972 | Bourland | 61/45 B |
| 3,731,791 | 5/1973 | Fourcade | 61/45 B |
| 3,864,443 | 2/1975 | Hopkins | 427/201 |
| 3,877,235 | 4/1975 | Hill | 61/45 B |
| 3,921,800 | 11/1975 | Burns | 61/45 B |
| 3,925,996 | 12/1975 | Wiggill | 61/45 B |
| 3,938,420 | 2/1976 | Dran | 85/76 |
| 3,964,948 | 6/1976 | Busse | 428/307 |

FOREIGN PATENT DOCUMENTS 2249834 4/1974 Fed. Rep. of Germany.

Primary Examiner—Ellis Robinson
Attorney, Agent, or Firm—Cruzan Alexander; Donald M. Sell; James A. Smith

[57] ABSTRACT

A process for reinforcing or sealing solid structures or for anchoring bolts using macrocapsules which contain at least one part of a multi-part curable polymer system and which fracture under pressure to produce flake-like fragments that aid in mixing the components of the multi-part curable polymer system. The macrocapsules can be conveniently made a part of a sealing cartridge for ease of use.

12 Claims, 2 Drawing Figures

METHOD FOR REINFORCING OR SEALING SOLID STRUCTURES OR FOR ANCHORING BOLTS THEREIN AND CARTRIDGES FOR USE IN SUCH METHOD

FIELD OF THE INVENTION

The present invention relates to a resin anchored rod system, to a rod anchoring process and to a curable resin containing cartridge which can be inserted into a hole and penetrated by the insertion of a rod, causing curing of the resin and securing of the rod therein.

DESCRIPTION OF THE PRIOR ART

The use of organic resins for rock stabilization and for anchoring rods in rock or masonry is well known, e.g., U.S. Pat. No. 2,952,129. In the 1959 United States Bureau of Mines Report of Investigation 5439 ("Cementation of Bituminous Coal Mine Roof Strata," Injection of Epoxy and Polyester Type Resins, E. R. Maize, R. M. Oitto, Jr.) the pumping of curable two-part epoxy or polyester resin systems into rock was shown to produce rock stabilization. Various approaches have been made to introduce a two-part resin system into a bore hole as represented in U.S. Pat. Nos. 3,108,443; 3,324,663; 3,698,196; 3,877,235 and 3,925,996. However, to insure intimate mixing of the several resin forming components the rod or anchor has been rapidly rotated in the bore hole, a cumbersome step which caused loss of time and required auxiliary equipment.

In U.S. Pat. No. 3,731,791 the reactive components have been placed in a fringible container where their separation is accomplished solely by a layer of reaction product, but rod rotation is still required to achieve full mixing. In order to increase the mixing of the various parts of the curable polymer system German OLS 2,249,834 describes the use of microcapsules (polyethylene polyamide or similar polymer) with a curable resin system encapsulated therein, the diameter of the microcapsules being as large as 8 mm, preferably less than 1 mm to create a satisfactory mixture of the proper proportions. As the rod is inserted into the hole, the microcapsules rupture and the resin system cures to reinforce the surrounding structure. Although in such a system the dispersion of the extremely small diameter microcapsules (i.e., less than 1 mm) does tend to insure better initial mixing, such small microcapsules tend to be difficult to rupture with the bolt or rod.

SUMMARY OF THE INVENTION

This invention provides an improvement in a rod anchoring process and in cartridges for fixing rods in solid structures, reinforcing solid structures and the like with the use of a multi-component curable polymer system (i.e., two or more components which when mixed together effect the reaction or cure to form a polymer or resin of higher molecular weight than any of the initial reactive components). The cartridges of this invention are generally cylindrical in shape and comprise a cylindrical array of relatively nonmobile, pressure fragmentable, non-friable capsules containing at least one part of the multi-part curable polymer system. The cylindrical array may have cross sectional diameter from about 5 mm to about 10 cm, generally corresponding to (but slightly less than) the diameter of the holes in which they may be inserted. Although the shape of the capsules is not critical (e.g., spherical, elongated, etc.), their major dimension must be in the range from 4.75 mm, preferably at least 8 mm (most preferably at least 10 mm) at about 95% of the cross sectional diameter of the cylindrical array, usually up to about 2 cm major dimension. Because of their size such capsules are referred to as "macrocapsules". When placed under increasing pressure, the capsules must fragment with the wall portion forming flake-like fragments.

Because the macrocapsules of this invention are relatively large, they are more readily ruptured by pressure, are less mobile in liquid media, are easily prepared from a variety of materials in a variety of shapes, and generally have more controllable wall thicknesses. However, even though the larger sized capsules initially provide a lesser degree of dispersion of the several components in the curable polymer system compared to smaller microcapsules, it has been found that the use of relatively large capsules which fragment under pressure to produce flake-like wall fragments rather than powder (as obtained from friable materials) compensates for their lesser degree of initial dispersion. This is attributed to the action of the flake-like fragments which serve, at least transitorily, as static mixers causing turbulence of the curable components released from the fractured macrocapsules and hence improved mixing of those components as the cylindrical array of macrocapsules is penetrated in the bore hole by the bolt or rod. In fact, such mixing is sufficiently thorough that rotation of the bolt or rod is unnecessary.

DETAILED DESCRIPTION

Figure 1:
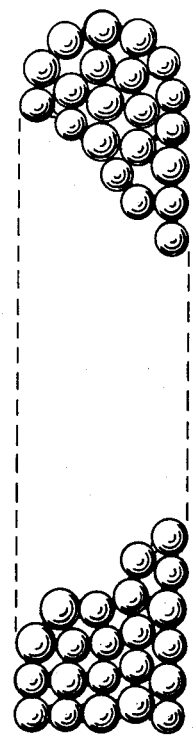
FIG. 1 is a side elevation view of a cartridge having no container and having macrocapsules bonded together at points of contact.
Figure 2:
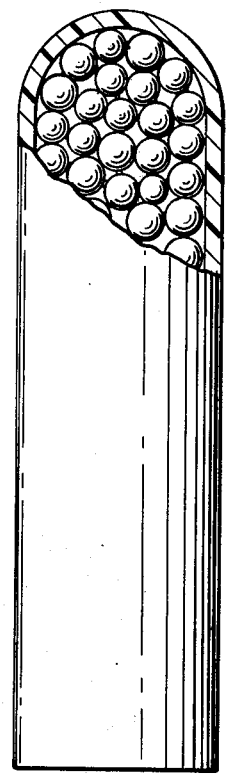
FIG. 2 is a side elevation view, with partial cross section, of a cartridge containing macrocapsules in a container.

In the cartridge of the present invention the cylindrical array of macrocapsules generally has a circular cross section to conform with the normal cross section of a drill hole. However, the edges may be fluted, serrated or of some other variant if one desires to vary the amount of the annular space between the cartridge and the drill hole while maintaining some contact of the cartridge with, or proximate relationship of the cartridge to, the walls of the drill hole, for example, to position or center the cartridge in the drill hole. The end of the cylindrical array need not be flat, and in some instances a conical or rounded end portion may make it easier to insert the cartridge into the bore hole. Within the cartridge the macrocapsules are distributed, preferably in a fixed three dimensional relationship either in a segregated or layered manner but preferably uniformly, in a generally cylindrical array. The macrocapsules therefore are restricted in space and are capable of at most only slight motion relative to each other. By bonding or adhesively securing the macrocapsules to each other, the array may be made self-supporting, as shown in FIG. 1. Alternatively, as shown in FIG. 2, they may be placed in a container which ruptures under pressure, such as an open mesh tube of friable material as shown in U.S. Pat. No. 3,699,687, a paper tube or a glass cylinder. A rigid, liquid permeable container which does not rupture readily under pressure (e.g. cylindrical metal screen) may be used if the rod used to rupture the macrocapsules therein has a smaller cross sectional area than the container, and preferably a rounded or conical nose portion, so it can move into the container. A pressure rupturable container which is fluid impermeable (e.g. sealed glass tube) is particularly useful if one or more fluid components of the curable system are not contained within the macrocapsules. For most applications, such as in mine roof reinforcement, rock consolidations and anchoring rods or bolts in solid structures, the cross sectional diameter of these cylindrical arrays, and normally also the approximate cross sectional diameter of the cartridge, is in the range of from 8 mm to 10 cm, preferably from 10 mm to 50 mm.

The macrocapsule walls must be impervious to the curable system component to be contained therein. If the basic wall material is not itself impervious, an impervious coating (e.g. wax, varnish, etc.) may be deposited thereon. It is also essential that such wall material be non-friable, since friable materials crumble directly into a powder upon disintegration under pressure, and powder will not serve as static mixers for the various components of the curable system. Furthermore, the wall material must break under pressure to form, at least initially, flake-like fragments (i.e., fragments of a shape which, if projected onto a plane so as to form a surface of maximum area, that area can be inscribed in a rectangle having dimensions X and Y, where X is at least four times the average fragment thickness and Y is at least four times the average fragment thickness, preferably Y is at least 10 times the average thickness, the average thickness being at least 100 microns). These initial fragments may be further broken into smaller pieces under continued pressure, and these pieces may ultimately no longer be flake-like. The flake-like fragments apparently serve as static mixers immediately after their formation, while the macrocapsule contents are released and commingled with the contents released from the surrounding macrocapsules. Illustrative of useful macrocapsules are twopart gelatin capsules of the type used for pharmaceuticals; organic and inorganic macrocapsules of the type described in West German OLS 2,603,534 (corresponds to U.S. Ser. No. 544,965, filed Jan. 29, 1975 now U.S. Pat. No. 4,111,713); hollow structures of the type shown in U.S. Pat. No. 3,864,443; and fired clay pillows of the type described in U.S. Ser. No. 761,265, filed Jan. 21, 1977 now U.S. Pat. No. 4,110,499, incorporated herein by reference. The suitability of any macrocapsule can readily be determined by subjecting an individual capsule to pressure and/or impact and examining the shape of the fragments to determine if any have flake-like shape. Macrocapsule walls of materials such as polyethylene polyamide (e.g. nylon), polyethylene and elastomers would not form the desired flake-like fragments and are therefore not useful in this invention.

Any multi-part organic curable resin system in which the major components are liquid and which is capable of forming a hard resin upon curing can be used in the cartridge and macrocapsules of this invention. Although systems curable under ambient conditions are greatly preferred, in some applications it may be possible to supply heat to the mixture, for example by heating the rod or anchor bolt before insertion. Curable systems which generate gas upon curing produce a foamed resin, and the pressure generated by the gas is advantageous in assisting the mixing of the components and in forcing the resin-forming mixture into any cracks or fissures in the walls of the bore hole, which reinforces the surrounding solid structure. Foaming curable systems are therefore particularly desirable for many applications, such as mine roof reinforcement. Epoxy resin systems are described in United States Bureau of Mines Reports of Investigation Nos. 5439 (E. R. Maize and R. H. Oitto, Jr., 1959) and 7907 (R. V. Subramanian, H. Austin, R. A. V. Raff and J. C. Franklin, 1973), the former also including polyester type resins. Polyurethane, melamine- or urea-formaldehyde systems are also very useful, see U.S. Pat. No. 3,698,196 and Gluechauf, Vol. 108, pages 582–4 (Alfons Jankowski). Liquid curable systems in which all the reactants are liquid under the ambient conditions of use are preferred to facilitate mixing and to improve resin impregnation of the surrounding solid structure. The water curable systems have the advantage of curing in water-wetted structures, e.g., rock formations in mines. Not every part of the multi-part curable system need be contained in the macrocapsules; some parts may be added to the cure site before inserting the cartridge into the bore hole, and unencapsulated liquid components, as mentioned earlier, may be retained in the cartridge if a liquid impermeable rupturable container is used.

The cartridges normally are used in a bore hole which is slightly larger in diameter than the cartridge to facilitate insertion. The rod or bolt used to rupture the macrocapsules in the cartridge is also selected to have a diameter slightly smaller than the bore hole and may have a rounded or conical nose portion. If the surrounding structure is relatively porous or contains fissures, it may be desirable to use a rod having a diameter very close to that of the bore hole to permit a maximum build-up of pressure upon insertion of the rod, which can assist in forcing the curing polymer system into the pores or fissures. However, a greater difference between the hole diameter and the rod diameter will make the rod insertion somewhat easier and will allow more of the curing polymer system to flow into the annular space between the rod and the hole, thereby more effectively anchoring the rod therein. After positioning the cartridge, or a plurality of individual macrocapsules, in the hole, the operator inserts the rod or bolt until it abuts the cartridge or macrocapsules at the end of the hole, then forces the bolt or rod into the cartridge or macrocapsules by hand or with a hammer or by machine, depending on the force required to break the macrocapsules, with no bolt or rod rotation required for mixing the reactive components of the curable polymer system. However, some rotation may be used to disintegrate the cartridge or ease insertion of the rod into the bore hole. After the insertion is completed, the mixed is permitted to cure without any rod rotation.

Although the mechanism of the macrocapsule fragmentation is not fully understood, it is believed that the initial effect of the rod penetrating the cartridge or individual macrocapsules is to selectively fragment by pressure those macrocapsules in the zone immediately adjacent the rod end, creating from the macrocapsules a plurality of flake-like fragments that promote turbulence and mixing of the various parts of the liquid curable polymer system in that zone. As the rod penetrates further, the mixed curing system is forced into the surrounding porous structure of the hole and/or into the annular space between the rod and the hole wall. This process is repeated as the rod progressively penetrates the cartridge or individual macrocapsules until its further motion is stopped by the end of the hole, by the compacted macrocapsule fragments accumulating at the end of the hole and/or by the progress of the polymer cure to a solid. However, whatever the dynamics of the macrocapsule fragmentation mechanism and of the mixing of the curable components, it is essential that the macrocapsule fragmentation generates in situ flake-like fragments rather than powder particles, which fragments facilitate mixing.

The practice of this invention is valuable not only for anchoring rods or bolts in solid structures but also in sealing or reinforcing the surrounding solid structures. When only sealing or reinforcement is desired, the rod can be removed from the hole before the resin cure is complete.

EXAMPLE 1

Macrospheres of phenolic resin-hollow glass microspheres, prepared as described in Ex. 22 of German OLS 2,603,534, having a nominal diameter of 0.48 cm, were filled with the following:

| Part A | Parts by Weight |
|---|---|
| Polyether triol of approximately 700 molecular weight, hydroxyl equivalent of 240, viscosity of about 300 cps at 25° C. ("Niax LHT 240", a trademarked product of Union Carbide Corporation) | 36.7 |
| 25 weight % potassium acetate in diethylene glycol | 1 |
| N,N-dimethylcyclohexylamine | 0.76 |

The filling operation was accomplished by placing the macrospheres in a flask, covering the macrospheres completely with the Part A mixture, drawing a vacuum on the flask to remove air from the hollow macrospheres, then releasing the vacuum to allow the Part A mixture to fill the macrospheres.

The macrospheres were then poured into a 2.5 cm diameter hole (14 cm deep) in a concrete block, filling approximately one-third of the hole volume. Into the hole was poured a second mixture (Part B) of the following composition:

| Part B | Parts by Weight |
|---|---|
| Polymethylene polyphenylisocyanate NCO equivalent weight of 132, NCO % = 31.5%, approximately tri-functional in NCO groups ("Mondur MRS", a trademarked product of Mobay Chemical Co.) | 23.3 |
| Silicone surfactant ("Surfactant L 540", a product of Union Carbide Corporation) | 0.1 |

The ratio of Part A to Part B was 16.7 parts by weight to 23.4 parts by weight. Parts A and B are liquid co-reactants which, upon mixing, react to produce a solid product or, if a trace of water is present, a rigid foam. The amount of foam is proportional to the amount of water present.

A 1.9 cm diameter rod was then pushed, without rod rotation, into the hole through the macrocapsules and Part B liquid mixture. The macrocapsules were crushed by the rod penetration, releasing their contents, and the reactants together with some of the flake-like macrocapsule wall fragments were forced into the annulus between the rod and the wall of the hole. Within five minutes the reaction had taken place, and foam filled the annulus. After the reaction was complete the concrete block was sectioned to expose the foamed resin, revealing an essentially homogeneous foam with flake-like macrocapsule wall fragments scattered through with an accumulation of fragments at the bottom of the hole. Sufficient mixing of the reactants had occurred without rod rotation because of the wall fragments serving as mixers.

EXAMPLE 2

Three runs were made using transparent polymethylmethacrylate tubes (2.5 cm diameter and 30 cm length) to allow observation of the mixing caused by macrocapsules fragments as a rod penetrates the macrocapsule array. Macrocapsules of the type described in Example 1, but with a diameter ranging from 0.32 to 0.95 cm, were filled using the same procedure described in Example 1. Some of the macrocapsules were filled with the Part A reactants of Example 1, and other were filled with the Part B reactants of Example 1.

31 Grams of the Part B filled macrocapsules were mixed gently with 21 g of the Part A filled macrocapsules, after which the mixture was placed in one of the transparent tubes. Approximately 22 cm of the tube height was filled with the macrocapsule mixture. A 1.9 cm diameter × 61 cm length iron rod was pushed downwardly without rotation through the macrocapsules until it reached the accumulated macrocapsule fragments at the bottom of the tube. After one minute foam was formed and started to rise in the tube. The enhanced mixing of the faster moving liquid reactants by the slower moving macrocapsule wall fragments was observed visually. After two minutes foam spilled over the top of the tube, and after seven minutes the hardness of the foam indicated the reaction was complete.

Into a second transparent tube was placed Part A filled macrocapsules, and the Part B liquid was poured over the macrocapsules. When the iron rod was inserted without rotation, as before, similar results were observed, with the foam density being higher than in the first run above.

Into a third transparent tube was placed Part B filled macrocapsules, and the Part A liquid was poured over the macrocapsules. After the iron rod was inserted without rotation, results similar to those obtained in the second transparent tube run were achieved.

EXAMPLE 3

Dry clay powder (M&D Ball Clay, a product of Kentucky-Tennessee Clay Co.) was mixed with successive increments of water until it was sufficiently plastic to be readily extrudable as a hollow tube. The extruded tube is cut into "pillows" by pinching the tube together at the desired intervals with a gear type cutter. The ends of the resulting pillows were flattened and closed so as to leave a hollow cavity inside the pillow shell. These pillows were then weighed, air dried, and then oven dried at 110° C. for 5–10 minutes. Finally the dried pillows were fired in a small electric kiln equipped with a thermocouple and galvanometer reading temperature directly in the kiln. The pillows were fired at 1100° C. for about two hours, after which power to the kiln was shut off. The pillows, after cooling overnight in the kiln, had a water impervious shell about 0.95 cm in diameter and 1.9 cm in length with 0.38 mm wall thickness. Such clay pillows are described in U.S. Pat. application Ser. No. 761,265, incorporated herein by reference.

A corner of each pillow was broken off to permit filling. One portion of the pillows was filled with Part A, "Epon 815" (a trademarked product of Shell Chemical Co.) consisting of a mixture of 89 parts by weight of diglycidyl ether of bisphenol A and 11 parts by weight of butyl glycidyl ether and having an epoxy equivalent weight of 175–195 and a viscosity of 500 to 700 cps at 25° C. A second portion of the pillows was filled with Part B, consisting of 1 part by weight of the polyether triol used in Example 1 ("Niax LHT 240") and 1 part by weight of diethylenetriamine, having a viscosity of 34 cps at 25° C.

113 Grams of the Part A filled pillows (containing a total of 58 grams of Part A reactant) were then carefully mixed together with 25 grams of the Part B filled pillows (containing a total of 11.6 grams of Part B reactant). 94 Grams of the pillows mixture was poured into a transparent plastic tube (2.54 cm diameter and 30.5 cm length). A 1.9 cm diameter iron rod was inserted to a depth of 17.8 cm and then forced without rotation into the pillow mixture by hammering. One hour later the exothermic reaction was complete, and the cured epoxy resin was transparent with flake-like pillow fragments throughout, with some accumulation of fragments at the bottom of the tube, indicating good mixing of the reactants.

The viscosity of the epoxy resin reactants is generally higher than that of the isocyanate systems. For higher viscosity curable resins it may be desirable to introduce thinners or diluents to reduce the viscosity and thereby improve the mixing.

EXAMPLE 4

This example illustrates the use of standard commercially available gelatin capsules used in the drug industry (#2 gelatin capsules, 17.5 mm length, 100 microns wall thickness, 6 mm diameter, a product of Eli Lilly). The Part A reactant mixture contained.

|  | Parts by Weight |
|---|---|
| Bisphenol A glycidyl methacrylate | 50 |
| Triethyleneglycol dimethacrylate | 50 |
| N,N-2 dihydroxyethyl paratoluidine | 2.4 |
| and the Part B reactant mixture contained: | |
| Bisphenol A glycidyl methacrylate | 50 |
| Triethyleneglycol dimethacrylate | 50 |
| Benzoyl peroxide | 1.1 |
| Butylated hydroxy toluene stabilizer | 500 parts per million parts (ppm) |

This reactant system utilizes a free radical initiated vinyl polymerization mechanism.

The two halves of each gelatin capsule were separated, and the fill material was placed in the smaller diameter half. One fraction of the gelatin capsules was filled with the Part A reactant mixture, and the other was filled with the Part B mixture. Approximately 37 grams of each part filled 95 capsules. The larger half of each capsule was then inserted over the filled smaller half, with no special provision for sealing the two halves together. 95 Part A filled capsules were mixed with 95 Part B filled capsules, and the resulting mixture was placed in a 2.5 cm diameter and 31 cm length transparent plastic tube. The capsule mixture was activated by insertion of a 1.9 cm diameter iron rod, without rod rotation. Virtually all of the gelatin capsules fractured and generated flake-like capsule fragments. After about 5 minutes the exothermic reaction had taken place to produce a hard, clear resin which bonded the rod to the clear plastic tube.

EXAMPLE 5

This example illustrates a rigid sealing cartridge having the macrocapsules in a container.

Macrospheres of the type described in Example 1 (about 7.9 mm diameter) were filled with the same procedures and same Part A and Part B reactants described in Example 1, but with a small hole made in each macrosphere to ease filling and with subsequent sealing of each macrosphere. The Part A filled capsules were dipped into a Part B solution to seal off the filling holes. Similarly the Part B filled capsules were dipped into a Part A solution to seal the filling holes. A mixture of the Part A filled and Part B filled macrocapsules (same reactant ratios as in Example 1) was packed tightly into a paper tube (0.7 mm paper thickness, slightly less than 25 mm tube diameter and 630 mm tube length).

Clay pillows of the type described in Example 3 (except each contains a 0.125 mm hole on one end and each has a 19 mm length and 7.9 mm diameter) were filled with the Part A and Part B reactants described above, using the filling and sealing procedures described above. A mixture of the Part A filled and the Part B filled pillows was tightly packed into a paper tube, as above, to provide a cylindrical array of the pillows and each end of the paper tube was closed with adhesive tape.

Three tubes of each type, i.e. macrosphere and clay pillow types, were placed in deep drill holes (25 mm diameter, 122 cm deep) in the roof structure of an operating copper mine. At a mine temperature of 12°–13° C. a Joy bolter machine was used to force standard roof bolts (19 mm diameter, 120 cm length) into the drill holes and through the tubes, causing rupture of the macrocapsules and pillows and initiating reaction. None of the samples showed any sign of unreacted resin running out of the holes. Approximately one week later the bolts were pulled with a standard bolt pull apparatus. Even at an extraction force of 11 tons, the bolts had a 2.5–5 mm deflection but did not release, which indicated good bonding of the bolts to the rock structure.

EXAMPLE 6

This example illustrates a rigid sealing cartridge having no container, the capsules being bonded to each other to form a rigid assembly.

Clay pillows of the type described in Example 5, having a diameter of 8 mm and a length of 19 mm, with a wall thickness of 0.5 mm, were filled with either Part A or Part B reactant system. Part A consisted of:

|  | Parts by Weight |
|---|---|
| Polyether triol of Part A in Ex. 1 | 367 |
| 25 weight % potassium acetate in diethylene glycol solution | 20 |
| N,N-dimethylcyclohexylamine | 7.6 |

Part B consisted of the polymethylene polyphenylisocyanate of Part B in Example 1. Pillows were filled, some with Part A and some with Part B, using the vacuum filling procedure described in Example 1. After each type of pillow was filled with reactant, it was sealed by dipping it into the other liquid reactant to form a film over the pillow, as described in Example 5.

Two parts by weight of the Part A filled pillows were mixed carefully to avoid breakage with three parts by weight of the Part B filled pillows. Then the pillow mixture was poured into a preformed tube made of 0.1 mm polyethylene (24 mm diameter and 300 mm length). The filled tube was contained in a 25 mm diameter rigid wall tube to maintain a circular cross-section and a straight axis. A bonding agent was poured through the polyethylene tube, coating each pillow, and allowed to drain out of the bottom of the tube. The bonding agent was a two-part curable mixture having the following components:

|  | Parts by Weight |
| --- | --- |
| Part 1 | |
| "Epon 815" (as defined in Ex. 3) | 90 |
| Phenyl glycidyl ether | 10 |
| Part 2 | |
| Diethylene triamine | 10 |

The drained assembly was allowed to cure at 25° C. for 16 hours. After cure the rigid tube mold was removed and the polyethylene film tube was stripped off. A totally self-supporting cylindrical array of the pillows (24 mm diameter and 300 mm length) was formed by bonding agent holding the pillows together without filling the voids between the pillows.

A 200 mm length of the above cylindrical array was placed in a 25 mm diameter hole (200 mm length) in a concrete block. A 19 mm diameter iron rod was inserted without rotation into the hole, using a hammer for the final distance. Within one minute after rod insertion, foam appeared in the annulus, indicating sufficient mixing and reaction. After five minutes the foam was hard, indicating complete reaction.

EXAMPLE 7

This example illustrates the mixing obtained with larger macrospheres.

Phenolic macrospheres of the type described in Ex. 1, but with a diameter of 12.7 mm±0.25 mm, were separated into two lots. The macrospheres of the first lot were punctured and filled from a syringe containing a fluorescent dye (rhodamine B) in water. The macrospheres in the second lot were filled in similar manner with a glycerol. A total of 24 macrospheres was then placed in a 30.5 cm high, 13.5 mm inside diameter glass tube, alternating macrocapsules from each lot as the tube was filled.

A 9.5 mm diameter steel rod (of the type used for cement reinforcement) was pushed into the glass tube and through the capsules, causing capsule fragmentation, without rod rotation. A series of photographs showed uniform mixing of the dye solution and the glycerol. If the macrocapsules were filled with two curable resin components rather than the dye and glycerol, similarly effective mixing can be achieved, with resulting cure of the components.

What is claimed is:

1. A sealing cartridge for reinforcing or sealing solid structure, anchoring bolts or the like comprising a cylindrical array of pressure fragmentable non-friable macrocapsules in a fixed three dimensional relationship, said cylindrical array having a cross sectional diameter from 5 mm to 10 cm, said macrocapsules (a) containing at least one part of a multi-part curable polymer system which is capable of curing to a hard resin, the major components of said curable resin system being liquid, (b) having a major dimension in the range of 4.75 mm to about 95% of the cross sectional diameter of said cylindrical array and (c) being capable of forming flake-like fragments from the walls of the macrocapsules upon their pressure fragmentation and release of their contents.

2. The cartridge of claim 1 in which the cylindrical array has a cross sectional diameter from 10 mm to 50 mm.

3. The cartridge of claim 2 in which the macrocapsules have a major dimension in the range of 8 mm to 2 cm.

4. The cartridge of claim 1 in which the macrocapsules are generally spherical.

5. The cartridge of claim 1 in which the macrocapsules are generally elongated.

6. The cartridge of claim 1 in which a portion of the macrocapsules contain one part of said multi-part curable polymer system and another portion of the macrocapsules contain a second part of said multi-part curable polymer system.

7. The cartridge of claim 1 in which said cylindrical array of macrocapsules is a unitary and cohesive mass.

8. The cartridge of claim 1 in which said cylindrical array of macrocapsules is confined in a container having a shape in conformity with said cylindrical array.

9. The cartridge of claim 8 in which said cylindrical array of macrocapsules is confined in a rigid liquid permeable cylindrical container.

10. The cartridge of claim 8 in which said container is a pressure rupturable container.

11. The cartridge of claim 8 in which said container is a tubular paper container.

12. The cartridge of claim 8 in which said cylindrical array of macrocapsules is confined in a liquid impermeable, pressure rupturable cylindrical container and one part of said multi-part curable polymer system therein is a liquid outside of said macrocapsules.

* * * * *